United States Patent
Marlow et al.

(10) Patent No.: US 9,074,488 B2
(45) Date of Patent: Jul. 7, 2015

(54) ARRANGEMENT FOR SEALING AN OPEN CAVITY AGAINST HOT GAS ENTRAINMENT

(71) Applicant: ALSTOM Technology Ltd, Baden (CH)

(72) Inventors: Paul Marlow, Baden (CH); Selma Zahirovic, Basel (CH); Robert Marmilic, Rieden (CH); Marc Widmer, Winterthur (CH); Joerg Krückels, Birmenstorf (CH)

(73) Assignee: ALSTOM Technology Ltd, Baden (CH)

( * ) Notice: Subject to any disclaimer, the term of this patent is extended or adjusted under 35 U.S.C. 154(b) by 24 days.

(21) Appl. No.: 14/154,487

(22) Filed: Jan. 14, 2014

(65) Prior Publication Data

US 2014/0197601 A1 Jul. 17, 2014

(30) Foreign Application Priority Data

Jan. 14, 2013 (EP) ..................................... 13151118

(51) Int. Cl.
  *F01D 11/00* (2006.01)
  *F01D 11/04* (2006.01)
  (Continued)

(52) U.S. Cl.
  CPC ................ *F01D 11/04* (2013.01); *F01D 11/02* (2013.01); *F16J 15/40* (2013.01); *F16J 15/44* (2013.01);
  (Continued)

(58) Field of Classification Search
  CPC ....... F01D 11/005; F01D 11/02; F01D 11/04; F01D 11/06; F01D 11/10; F16J 15/40; F16J 15/44; F16J 15/443; F16J 15/4472; F16J 15/4476

USPC .......................................................... 277/431
See application file for complete search history.

(56) References Cited

U.S. PATENT DOCUMENTS 3,365,172 A * 1/1968 Werner et al. ................. 415/117
3,645,544 A   2/1972 Unsworth et al.
(Continued)

FOREIGN PATENT DOCUMENTS

CN    1682012 A    10/2005
CN    1965187 A     5/2007
(Continued)

OTHER PUBLICATIONS

Office action issued from Chinese Patent Office dated Mar. 2, 2015 for CN Application No. 201410015378.9.

*Primary Examiner* — Kristina Fulton
*Assistant Examiner* — Nicholas L Foster

(57) ABSTRACT

The invention refers to an arrangement for sealing an open cavity against hot gas entrainment. The open cavity is arranged between two axially adjacent stationary components limiting radially a hot gas path of a rotary flow machine, of which at least the downstream component carries at least one airfoil extending radially into said hot gas path. A multitude of air jets is directed into the open cavity such that hot gas flowing over the open cavity is prevented from penetrating into the open cavity completely. The invention has an arrangement of supply conduits for air jets which are directed into the open cavity with a jet momentum such that hot gas is induced not to enter the open cavity and forming at least one hot gas vortex close to the hot gas path within the open cavity and preventing hot gas from penetrating into the open cavity beyond the extension of the hot gas vortex.

6 Claims, 2 Drawing Sheets

(51) Int. Cl.
*F01D 11/02* (2006.01)
*F16J 15/40* (2006.01)
*F16J 15/44* (2006.01)
*F01D 25/12* (2006.01)

(52) U.S. Cl.
CPC ............ *F16J 15/443* (2013.01); *F01D 11/005* (2013.01); *F01D 25/12* (2013.01); *F05D 2240/121* (2013.01); *F05D 2240/127* (2013.01)

(56) References Cited

U.S. PATENT DOCUMENTS

| | | | |
|---|---|---|---|
| 5,759,012 A | 6/1998 | Glezer et al. | |
| 6,276,692 B1 * | 8/2001 | Beeck et al. | 277/411 |
| 7,494,319 B1 | 2/2009 | Liang | |
| 7,988,410 B1 * | 8/2011 | Liang | 415/173.1 |
| 2005/0123389 A1 | 6/2005 | Morris et al. | |
| 2005/0129499 A1 * | 6/2005 | Morris et al. | 415/1 |
| 2008/0310950 A1 * | 12/2008 | Young et al. | 415/116 |
| 2010/0232929 A1 * | 9/2010 | Joe et al. | 415/1 |
| 2014/0234076 A1 * | 8/2014 | Lee et al. | 415/116 |

FOREIGN PATENT DOCUMENTS

| | | |
|---|---|---|
| EP | 0 902 164 | 3/1999 |
| EP | 1 347 153 | 9/2003 |
| EP | 1 741 877 | 1/2007 |
| GB | 855040 | 11/1960 |
| WO | 2009/083456 | 7/2009 |

* cited by examiner

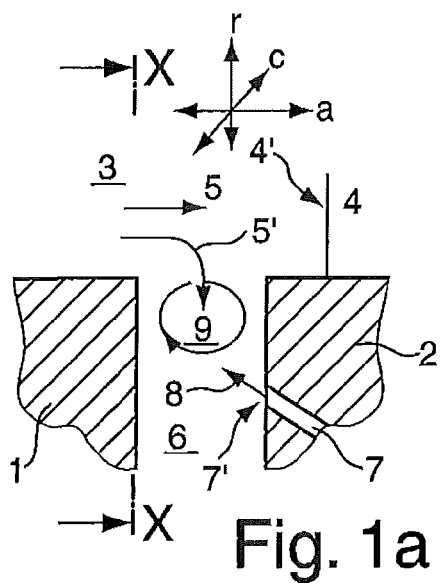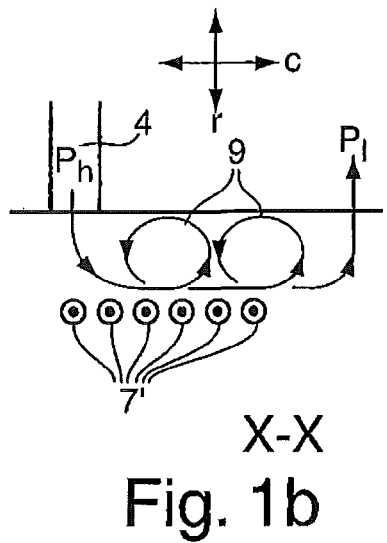
Fig. 1a    Fig. 1b
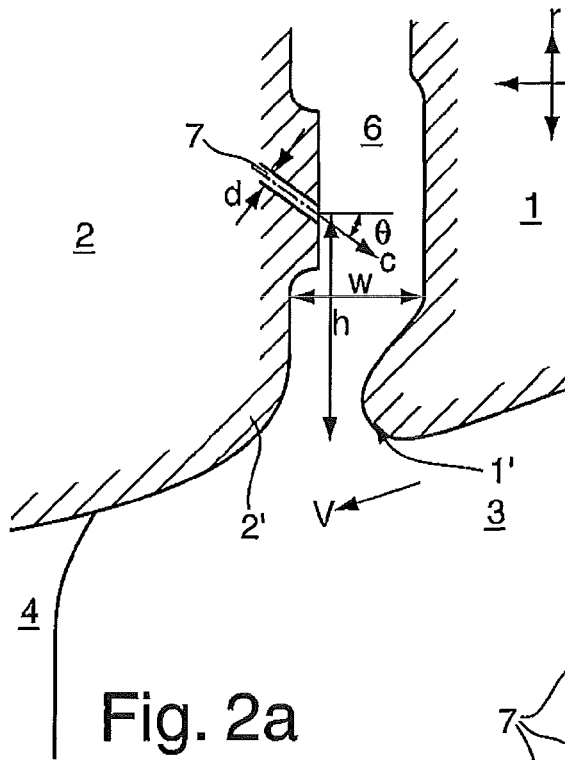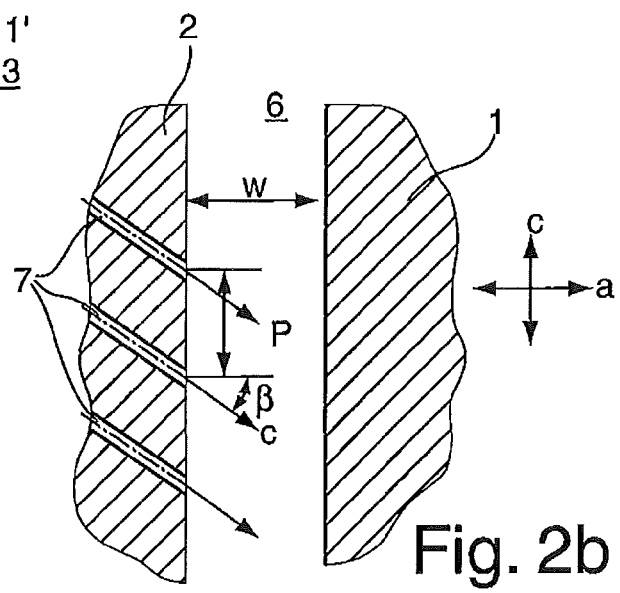
Fig. 2a    Fig. 2b

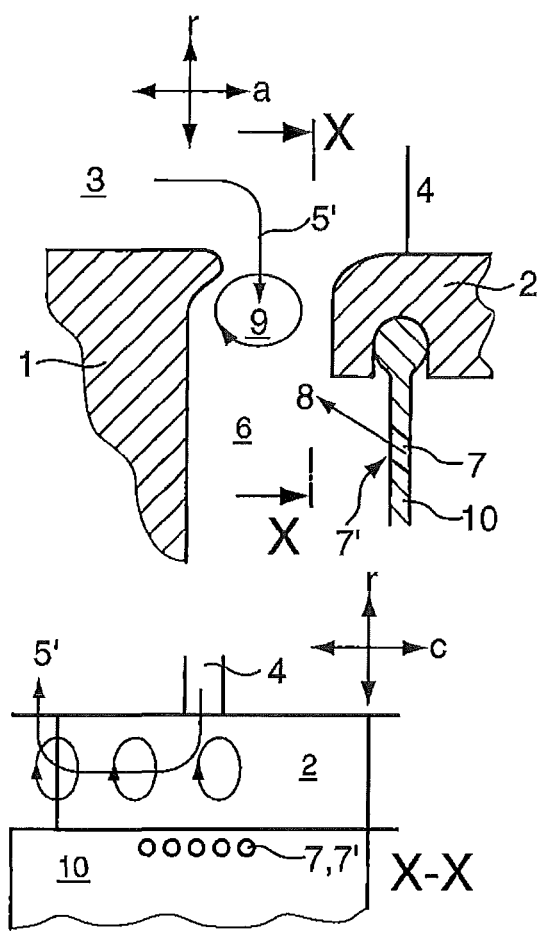
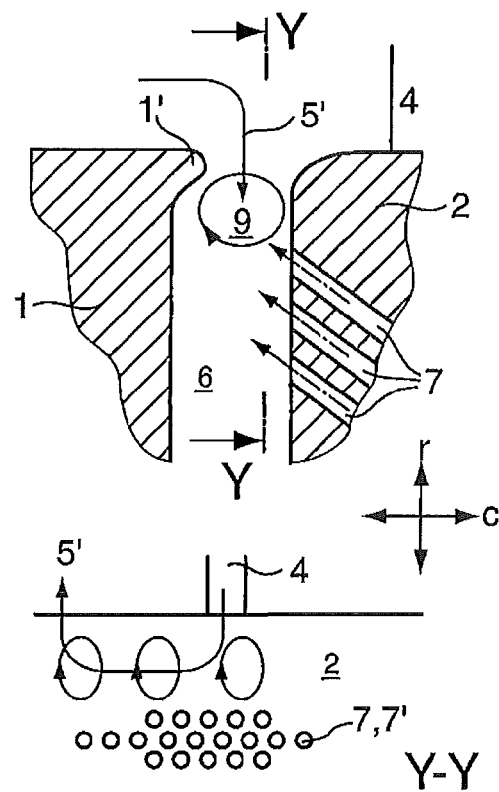
Fig. 3a
Fig. 3b
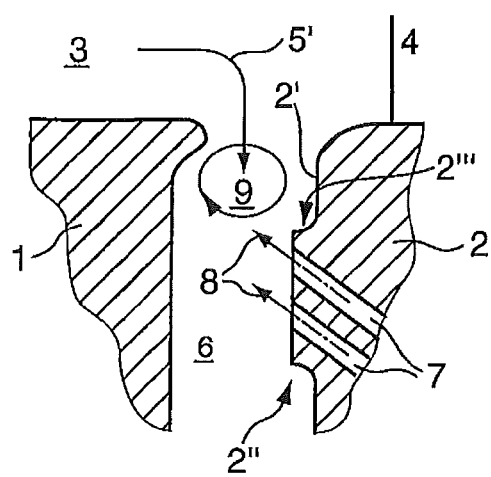
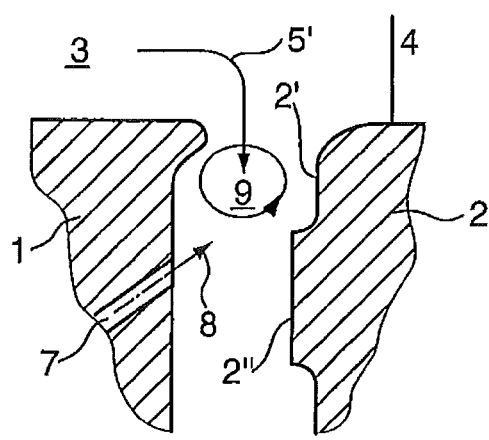
Fig. 3c
Fig. 3d

ARRANGEMENT FOR SEALING AN OPEN CAVITY AGAINST HOT GAS ENTRAINMENT

CROSS-REFERENCE TO RELATED APPLICATIONS

This application claims priority to European application 13151118.0 filed Jan. 14, 2013, the contents of which are hereby incorporated in its entirety.

TECHNICAL FIELD

The invention refers to an arrangement for sealing an open cavity against hot gas entrainment, wherein said open cavity being arranged between two axially adjacent stationary components limiting radially a hot gas path of a rotary flow machine, of which at least the downstream component carries at least one airfoil extending radially into said hot gas path, and a multitude of air jet is directed into said open cavity such that hot gas flowing over the open cavity is prevented from penetrating into the open cavity completely.

BACKGROUND

The design of rotary flow machines, especially a gas turbine, requires end-to-end mounting of components which are stationary and/or moving relative to one another. For functional reasons, one or more open cavities or gaps, over which in case of a turbine a hot gas flow flows in the hot gas path of the turbine, often remain between these components. Penetration of the hot gas into open cavities between components must be avoided at all costs on account of the high temperatures of the hot gas, which are often even higher than the maximum permissible material temperatures. Hot gas, which nonetheless penetrates into the cavities, as a consequence of the heat exchange with the components adjacent to the cavities, may therefore lead to inadmissibly high temperatures of these components. This in turn is the reason of component damage, in particular in the form of component cracks or an at least marked reduction in the service life of these components.

Typically these open cavities have been sealed against the hot gas penetration by means of mechanical seals such as, for example, seal plates and seal strips, bellows and spring-loaded seals or even by means of arrangements for fluid-dynamic sealing. Mechanical seals, on account of their contacting operating principle, are subjected to abrasive wear and consequently have only a limited service life.

Described in Patent Specifications GB 855 040 and U.S. Pat. No. 3,645,544 are sealing arrangements in which, in order to seal a gap against hot gas penetration, a secondary fluid is supplied into the gap in such a way that a vortex system forms in the gap. However, the sealing arrangements described in each case can be used only for gaps between two components where the components rotate relative to one another and the gaps in each case extend over the entire periphery.

A further known arrangement for sealing a gap against hot gas penetration is disclosed in EP 1 347 153 B1 in which a vortex flow is generated by feeding additional air into the gap between two axially adjacent components each bordering at least partially the hot gas path of a gas turbine. In a preferred embodiment inside the gap in shape of a one side open cavity a chamber is arranged in the longitudinal direction of the gap which is designed as a rotary chamber having a circular or elliptical cross section into which supply conduits merge through which air is injected approximately tangential relative to the vortex flow within the vortex chamber. The sealing function of the arrangement bases on the intense air vortex inside the gap which prevents the hot gas to enter the gap.

WO2009/083456 A1 describes a gas turbine with cooling ports distributed around circumference through which cooling air is injected into the hot gas flow of the combustion chamber outlet. In order to improve the flow conditions in the hotgas in such a gas turbine, the cooling air ports are subdivided into a first group of cooling ports which corresponds to the arrangement of guide vanes and a second group which corresponds to the arrangement of the burners.

Those known solutions using a blocking air flow injected into the gap so that hot gas is purged out of the gap air have the disadvantage of a high air consumption which causes high operating costs and decreasing total efficiency of such a rotary flow machine.

EP 1 741 877 A1 describes a turbine thermal heat shield and a guide vane for a gas turbine with an open cavity between the two adjacent components. The heat shield element has in downstream direction a perpendicular bent wall with cooling bores (FIG. 4, FIG. 7). Between said perpendicular wall and the supporting structure of the combustion chamber with the heat shield is a residual gap arranged which allows a movement of the wall and a closing of the gap during operation.

Document EP 0 902 164 A1 describes a platform cooling having a guide-blade platform which is subjected to a hot gas stream and is separated by a gap from a combustion chamber segment arranged upstream, one or more segment cooling bores being arranged in the combustion chamber segment. The segment cooling bores connect a cooling air chamber to the gap. The guide-blade platform has a surface on the downstream side in the region of the gap, the axes of the one or more segment cooling bores (multiple bores are arranged one after another in circumferential direction) running roughly tangentially to said surface. That means special geometric cavity features are required. The described platform cooling arrangement is advantageously used for gaps with widths of less than 5 mm, preferably less than 2 mm. In FIG. 3 of EP 0 902 164 A1 is shown that the segment cooling bores and the platform cooling bores are arranged alternately so as to be staggered relative to one another along the circumference.

SUMMARY

It is a general object of the present invention to provide an arrangement for sealing an open cavity against hot gas entrainment which shall avoid the before mentioned disadvantages especially to reduce the amount of necessary air to realize a sealing effect at a open cavity only by means of a shielding air flow.

The object is achieved by the arrangement given in claim 1. The invention can be modified advantageously by the features disclosed in the sub claims as well in the following description especially referring to the preferred embodiment.

An important aspect concerning the flow conditions in the region of an open cavity relates to the pressure conditions prevailing upstream to an airfoil which is impinged by the hot gas flow of the rotary flow machine. Upstream to the leading edge of the airfoil, for example of a vane, very high pressure prevails locally due to the bow wave effect so that hot gas tends in a reinforced manner to penetrate into the open cavity. To prevent such hot gas entrainment directly upstream to the leading edge of the airfoil it is proposed to feed a multitude of air jets into said open cavity at a location close to the at least one airfoil. The at least one air jet is directed into the open cavity having a flow direction being in or in opposite flow direction of the axial hot gas flow and being inclined with respect to the axial hot gas flow direction by an angle θ with $0°≤θ≤60°$. Further the at least one air jet is directed within said open cavity into the open cavity having a distance h to the hot gas path which is about 5 mm to 100 mm depending on size and geometrical situation of the components bordering the open cavity.

Due to the before mentioned bow wave effect some hot gas will enter the open cavity with a penetration depth which is given by the location of at least one orifice of a supply conduit through which the at least one air jet emits into the open cavity. Since the air jet is inclined towards the penetrating hot gas the air jet enables the hot gas entrainment to start a vortex motion, i.e. the at least one air jet triggers the vortex motion of the hot gas penetrating into the open cavity. The vortex consisting mainly of hot gas is limited by two side walls of the axial adjacent arranged components bordering the open cavity and is further limited radially by the hot gas flow flowing over the open cavity and by the at least one air jet which is directed into the open cavity at a location having a given distance to the hot gas path.

In contrast to the generic state of the art which uses the air flow directed into a gap of adjacent arranged components within a hot gas path as the main blocking fluid for preventing entrainment of hot gas into the gap, so that a huge amount of air flow is necessary, the inventive technique uses the hot gas itself as a blocking medium to prevent further entrainment of hot gas into the open cavity whereby the at least one air jet directed into the open gap serves as a trigger flow to enable the penetrated hot gas for conducting a vortex motion. The inventive idea is associated with the advantage that the amount of air to initiate a vortex motion within the hot gas entrainment is significantly less than the invested air amount for preventing hot gas entrainment using known technique as described before. This advantage further supports an increase of efficiency of operating a rotary flow machine since only a small amount of air have to be provided for the inventive sealing mechanism.

Hot gas which enters the open cavity in an upstream region of the leading edge of an airfoil due to a local pressure rise is fluid dynamically forced to vortex motion within the upper region of the open cavity triggered by the at least one air jet and propagates spirally from the region of highest pressure in circumferential direction and leaves the open cavity circumferentially beside the airfoil.

A further important aspect for creating the hot gas vortex concerns the air jet momentum by which the at least one air jet is directed into the cavity through a supply conduit passing through one of the two components which limit the open cavity. In many experimental studies carried out by the applicant it was recognized that the amount of air and the flow velocity by which the air jet enters the open cavity have to be chosen depending on the hot gas flow within the hot gas path of the rotary flow machine. Typically the hot gas flow has a flow velocity V between Mach 0.05 and Mach 0.5. The Mach number represents the ratio between the flow velocity and the speed of sound. Depending on the hot gas flow velocity the at least one air jet is directed into the open cavity having a flow velocity which is between Mach 0.1 and Mach 0.8. Preferably the at least one air jet is fed through a supply conduit merging into the open cavity which supply conduit has a diameter d between 0.4 mm and 3 mm.

According to the inventive arrangement one of the two components bordering the open cavity axially provides a multitude of supply conduits so that a multitude of air jets enter the open cavity. The orifices of each of the supply conduits which are arranged at the side wall of one component bordering the open cavity axially are spatially distributed such that most of the single air jets enter the open cavity in a region which is axially and in circumferential direction close to the airfoil and the number of air jets getting smaller the further away the air jets being located in circumferential direction from the airfoil. In a preferred embodiment a multitude of single air jets are grouped in one row which extends in circumferential direction along the side wall of one component. At least two orifices of each supply conduit are arranged side by side in circumferential direction along one row closing a mutual pitch p of the 2-fold till 20-fold diameter of the orifices of each of the supply conduits. Air jets from such a single row of supply conduits are sufficient to block hot gas entrainment into an open cavity, when the pitch (within said given range) is small, that means near the lower limit of said given range.

In a further preferred embodiment more than one row are arranged at the side wall of one component, preferably up to five radial distributed rows of orifices of supply conduits wherein adjacent rows are in a staggered arrangement. The pitch can then be larger (near the upper limit of said given range).

Typically the open cavity provides an axial width w which is between 5 mm and 30 mm and further provides a circumferential extension which in case of a gas turbine arrangement extends annually around the hot gas path completely. The air saving is especially high when blocking hot gas entrainment into large axial cavity widths w of about ≤30 mm.

Another advantageous aspect of the invention concerns the simple design of the open cavity which has a cross-section in a plane along the flow axis of the rotary flow machine which is limited axially by two walls almost parallel and facing each other and opens toward the hot gas path. Further the at least one supply conduit merges into said open cavity at one of the two walls. To generate the hot gas vortex inside the open cavity no complex fluidic conducting element or contour is required. In a simple embodiment the open cavity have a cross section just in shape of a rectangular geometry. In order to avoid deep penetration of hot gas into the open cavity the edge region of the upstream component bordering the open cavity provides a collar like extension overlapping the open cavity partially. The edge region of the downstream component, however, is designed aero-dynamically.

The basic idea of the invention can be applied to rotary flow machines of any kind, preferably on a gas or steam turbo machine. Preferably the rotary flow machine is a turbine or a compressor of a gas turbine arrangement and the two axially adjacent stationary components are a heat shield segment and a vane or a sealing component being connected to the heat shield segment or the vane.

Further aspects of the inventive arrangement for sealing an open cavity against hot gas entrainment will be discussed in the following referring to preferred embodiments.

BRIEF DESCRIPTION OF THE FIGURE

The invention shall subsequently be explained in more detail based on exemplary embodiment in conjunction with the drawing. The drawing FIG. 1a, b shows a schematically cross section through two components limiting an open cavity in an axial direction of a rotary flow machine, and a schematically axial view of the component carrying the airfoil;

FIG. 2a, b shows a preferred embodiment of two components limiting the open cavity in an axial cross section and in a radial direction and FIG. 3a-d shows different embodiments for injecting air jets into an opening cavity.

DETAILED DESCRIPTION

FIG. 1a shows a coarse sketch of a cross section of two components 1, 2 of a rotary flow machine in an axial plane view. In the following it is assumed that the components 1, 2 border radially r the hot gas path 3 of a gas turbine. Component 1 is a heat shield segment followed downstream by the platform 2 of a vane having an airfoil 4 extending into the hot gas path 3 of the gas turbine. The flow direction of the hot gas is indicated by the arrow 5. The heat shield segment 1 and the platform 2 of the vane border axially an open cavity 6 which finally is caused by design requirements.

For further explanation the given orthogonal axes, r, c, a, in FIG. 1a explain the directions to which the further description will refer. The axial direction "a" is defined by the flow direction of the hot gas flow 5. The radial direction r is perpendicular to the the axial direction a. Further the circumferential direction c is perpendicular to radial r and axial a direction and is orthogonal to the plane of projection in FIG. 1a. In case of FIG. 1a the hot gas flow 5 is axially directed and impinges the leading edge 4' of the airfoil 4 of the vane. Due to the bow wave effect directly upstream of the leading edge 4' of the airfoil 4 a high pressure region prevails and leads to a reinforced penetration of hot gas 5 into the open cavity 6. At least one supply conduit 7 is arranged within the open cavity 6 very close in circumferential c and axial a direction to the leading edge 4' of the airfoil 4 for directing an air jet 8 into the open cavity. The air jet 8 has a jet momentum such that the hot gas entrainment 5' is induced to form at least one hot gas vortex 9 very close to the hot gas path 3 within said open cavity 6. The hot gas vortex 9 prevents hot gas flow 5 from penetrating into said open cavity 6 beyond the extension of the hot gas vortex 9. The inventive idea is to use the hot gas 5 as a blocking medium to avoid hot gas entrainment 5' into the open cavity completely. The at least one air jet 8 which is directed into the open cavity 6 serves merely as a trigger flow to create the requirement for generating a stable vortex flow within the open cavity 6.

The high pressure $p_h$ prevailing axially directly upstream of the leading edge 4' of the airfoil 4, caused by the bow wave effect, drops significantly in circumferential direction c. In a circumferential distance to the airfoil 4 the pressure reduces to a low pressure $p_l$ as indicated in the axial view shown in FIG. 1b. Due to the pressure gradient in circumferential direction c the hot gas entrainment 5' is initiated by the at least one air jet 8 within said open cavity 6 to perform a hot gas vortex 9 propagating spirally in circumferential direction c and leaving the open cavity 6 beside the airfoil 4 which is shown in FIG. 1b. To avoid a deeper penetration of the spirally propagating hot gas vortex 9 in radial direction r into the open cavity 6 a multitude of air jets 8 are directed from the wall side of the platform 2 of the vane. FIG. 1b shows the orifices 7' of the supply conduits 7 through which air jets 8 enters the open cavity 6.

To realize and establish a hot gas vortex 9 within the open cavity 6 close to the hot gas path 3 a series of requirements must be fulfilled concerning the geometrical design of the open cavity 6 as well fluid-dynamic aspects. FIG. 2a shows a cross section in an axial plane view through the components 1, 2 which are static component of a gas turbine limiting the hot gas path 4 of a gas turbine stage. Component 1 is a heat shield segment and component 2 which is arranged in downstream direction to component 1 is the platform 2 of a vane carrying the airfoil 4. Between the two components 1, 2 there is an open cavity 6. Basically the open cavity 6 is limited by the two opposing wall sides of the two components 1, 2 which are parallel to each other. The heat shield segment 1 provides a collar like shaped edge 1' which extends partially in axial direction a over the open cavity 6 to avoid a direct entrainment of hot gas flow 5 into the open cavity 6. The edge 2' of the platform 2 of the vane is of aero-dynamic shape to avoid any turbulence in said edge region. At least one supply conduit 7 passes through the platform 2 having an orifice 7' which has a distance h to the hot gas path 3 which is preferably between 5 mm and 100 mm inclusively. The typical width w of the open cavity 6 ranges between 5 mm and 30 mm. The supply conduit 7 is inclined by an angle θ relative to the axial direction a which corresponds to the flow direction 5 of the hot gas flow in the hot gas path 3 which is 0°≤θ≤60°. Basically the direction of the air jet 8 entering the open cavity 6 is directed towards the hot gas path 3 so that the hot gas 5' entering the open cavity 6 are forced fluid dynamically to change their entraining flow direction for forming the before mentioned hot gas vortex. The diameter d of the at least one supply conduit 7 ranges between 0.4 mm and 3 mm inclusively whereby the air jet leaving the supply conduit has an outlet velocity ranging between Mach 0.1 and Mach 0.8. The hot gas flow velocity V typically ranges between Mach 0.05 and Mach 0.5.

In order to support the circumferential propagation of the spirally hot gas vortex 9 within the open cavity 6 the supply conduits 7 further are inclined relative to the axial direction in a radial view as shown in FIG. 2b by an angle β which is between 0°<β≤60°. Two adjacent arranged orifices 7' of each supply conduit 7 provides a pitch p which ranges between a two-fold and twenty-fold diameter d of the supply conduit 7.

FIGS. 3a to d show several preferred embodiments for producing a hot gas vortex 9 within an open cavity 6 of a rotary flow machine. FIG. 3a shows in the upper sketch a cross section comparable to the views shown in FIGS. 1a and 2a. Here the platform 2 of the vane is connected to a seal membrane element 10 in which the supply conduit 7 is arranged through which the air jet 8 is directed into the open cavity 6.

In the lower representation of FIG. 3a an axial view onto the seal member element 10 connected to the platform 2 of the vane is illustrated which shows five adjacent arranged supply conduits 7 in one row which are arranged very close in circumferential direction c to the airfoil 4. Air jets 8 from a single row of supply conduits 7 are sufficient to block hot gas entrainment 5' into the open cavity 6, when the pitch is small, not much more than 2 d.

It is also possible to provide more supply conduits 7 being arranged in several rows, each adjacent row is in staggered configuration as it is shown in FIG. 3b lower representation, which also shows an axial view onto component 2. Depending on pressure conditions and a required amount of air more than three different rows of supply conduits can be arranged in a staggered formation. FIG. 3b shows in the upper section an axial cross section view of an upstream heat shield element 1 and a downstream platform 2 of a vane enclosing the open cavity 6. Three supply conduits 7 are shown which correspond to different rows of supply conduits arranged separately in radial direction. In such an arrangement the pitch p can be larger (p≤20 d). Air jets 8 are positioned at a small distance h from the hot gas flow 5.

Combining multiple rows of closely pitched staggered holes located very closely to the hot gas flow uses less feed air than it was previously possible with the known technical solutions. The air saving is especially high when blocking hot gas entrainment into a large cavity 6 with a width near or maximal 30 mm. An additional advantage is that, unlike the known arrangements, special cavity geometrical features are not required. With the invention it is realized that the air jets 8 are directed into the open cavity 6 such that hot gas flowing over the open cavity 6 being prevented from penetrating into the open cavity 6 completely.

The embodiment shown in FIG. 3*b* shows also that the open cavity 6 is limited axially by two parallel side walls facing each other which do not have any complex wall contours beside of the collar like edge region 1' of the heat shield element 1.

In FIG. 3*c* an embodiment is shown with a platform 2 of the vane which provides a side wall 2' having a protruding wall area 2" in which the supply conduits 7 opens into the open cavity 6. The protruding wall area 2' together with the air jets 8 directed into the open cavity 6 supports to generate and localize the hot gas vortex 9 in a region of the open cavity close to the hot gas path 3. Especially the edge contour 2''' supports the forming of a closed hot gas vortex 9 in combination with the air jets 8 directed into the open cavity 6.

The embodiment shown in FIG. 3*d* shows that it is also possible to arrange the supply conduit 7 at the upstream component 1 which is the heat shield element 1. In this case the side wall 2' of the platform 2 of the vane 4 also provides the protruding wall area 2" as mentioned in FIG. 3*c*.

Basically it is possible to combine all the before mentioned features shown in the above embodiments.

The invention claimed is:

1. An arrangement for sealing an open cavity against hot gas entrainment the arrangement comprising: two axially adjacent stationary components having said open cavity arranged there between for limiting radially a hot gas path of a rotary flow machine, of which at least the downstream component carries at least one airfoil extending radially into said hot gas path; a multitude of supply conduits arranged in at least one row passing through one of the two stationary components merge into said open cavity for directing air jets into said open cavity, wherein each of the supply conduits:
    merges into the open cavity in a distance h to the hot gas path with 5 mm≤h≤100 mm,
    has a conduit axis at its outlet being inclined with respect to the axial hot gas flow direction by an angle θ with 0°≤θ≤60° and being inclined in an circumferential direction with respect to said axial hot gas flow by an angle β with 0°<β≤60°,
    has a diameter d with 0.4 mm≤d≤3 mm, and
    is arranged at a location close to the at least one airfoil;
    wherein the open cavity provides an axial width w with 5 mm<w≤30 mm and a circumferential extension, and the adjacent supply conduits are arranged side by side in the circumferential direction closing a mutual pitch p with 2 d≤p≤20 d.

2. The arrangement according to claim 1, wherein the pitch p is small with 2 d≤p≤5 d and the supply conduits are arranged in a single row of supply conduits.

3. The arrangement according to claim 1, wherein the pitch p is larger than 5 d up to p≤20 d and the supply conduits are arranged in multiple rows of staggered supply conduits.

4. The arrangement according to claim 1, wherein the axial width w is 10 mm<w≤30 mm.

5. The arrangement according to claim 1, wherein the open cavity in a plane along the flow axis of the rotary flow machine is limited axially by two walls almost parallel to each other and facing each other and opens towards the hot gas path, and that the supply conduits merge into said open cavity at one of the two walls.

6. The arrangement according to claim 1, wherein the rotary flow machine is a turbine or a compressor of a gas turbine arrangement and the two axially adjacent stationary components are a heat shield segment and a vane or a sealing component being connected to the heat shield segment or the vane.

* * * * *